United States Patent
Drooghaag et al.

(10) Patent No.: US 9,160,841 B2
(45) Date of Patent: Oct. 13, 2015

(54) DEVICE AND METHOD FOR DETECTING ABSENCE OF A POTS SPLITTER IN A DIGITAL SUBSCRIBER LINE

(71) Applicant: Alcatel Lucent, Boulogne Billancourt (FR)

(72) Inventors: Benoît Drooghaag, Ophain-Bois-Seigneur-Isaac (BE); Issam Wahibi, Schaerbeeck (BE)

(73) Assignee: Alcatel-Lucent, Boulogne-Billancourt (FR)

( * ) Notice: Subject to any disclaimer, the term of this patent is extended or adjusted under 35 U.S.C. 154(b) by 0 days.

(21) Appl. No.: 14/371,686

(22) PCT Filed: Feb. 5, 2013

(86) PCT No.: PCT/EP2013/052210
§ 371 (c)(1),
(2) Date: Jul. 10, 2014

(87) PCT Pub. No.: WO2013/117531
PCT Pub. Date: Aug. 15, 2013

(65) Prior Publication Data
US 2014/0376702 A1  Dec. 25, 2014

(30) Foreign Application Priority Data
Feb. 9, 2012 (EP) .................. 12290048

(51) Int. Cl.
| | | |
|---|---|---|
| H04M 1/24 | (2006.01) | |
| H04M 3/08 | (2006.01) | |
| H04M 3/22 | (2006.01) | |
| H04M 3/30 | (2006.01) | |
| H04M 11/06 | (2006.01) | |
| H04M 3/51 | (2006.01) | |

(52) U.S. Cl.
CPC ............. *H04M 3/22* (2013.01); *H04M 3/306* (2013.01); *H04M 3/5166* (2013.01); *H04M 11/062* (2013.01); *H04M 3/085* (2013.01); *H04M 2203/056* (2013.01)

(58) Field of Classification Search
CPC ... H04M 11/062; H04M 3/2209; H04M 3/30; H04M 3/34; H04M 1/24; H04L 41/0853; H04B 3/487
USPC .............. 379/1.01, 1.03, 1.421, 22.02, 22.07, 379/27.01, 29.05, 32.04, 1.04, 21
See application file for complete search history.

(56) References Cited

U.S. PATENT DOCUMENTS 6,819,601 B2 * 11/2004 Eliason et al. ........... 365/189.09
6,829,330 B2 * 12/2004 Belge et al. ................ 379/22.04

(Continued)

FOREIGN PATENT DOCUMENTS

EP    1761012 A1    3/2007

OTHER PUBLICATIONS

International Search Report PCT/ISA/210 for International Application No. PCT/EP2013/052210 Dated May 2, 2013.

*Primary Examiner* — Binh Tieu
(74) *Attorney, Agent, or Firm* — Harness, Dickey & Pierce, P.L.C.

(57) ABSTRACT

A device for detecting absence of a Plain Old Telephony Service or POTS splitter on a Digital Subscriber Line, includes a device for collecting channel transfer function data or the Digital Subscriber Line, and a device for detecting a single hole in the channel transfer function data.

5 Claims, 3 Drawing Sheets

(56) References Cited

U.S. PATENT DOCUMENTS

| | | |
|---|---|---|
| 7,272,209 B2 * | 9/2007 | Jiang et al. .................. 379/1.04 |
| 7,809,116 B2 * | 10/2010 | Rhee et al. .................. 379/1.04 |
| 2003/0002658 A1 * | 1/2003 | Belge et al. .................. 379/377 |
| 2005/0123027 A1 | 6/2005 | Cioffi et al. |
| 2008/0205501 A1 * | 8/2008 | Cioffi et al. .................. 375/224 |
| 2008/0292064 A1 * | 11/2008 | Wu et al. .................. 379/22.04 |
| 2011/0058502 A1 * | 3/2011 | Feng .................. 370/255 |

* cited by examiner

DEVICE AND METHOD FOR DETECTING ABSENCE OF A POTS SPLITTER IN A DIGITAL SUBSCRIBER LINE

FIELD OF THE INVENTION

The present invention generally relates to detecting absence of a Plain Old Telephone Service (POTS) splitter on a Digital Subscriber Line (DSL), e.g. a Very High Speed Digital Subscriber Line (VDSL) or Asynchronous Digital Subscriber Line (ADSL) used for bi-directional data transfer over twisted pair telephone wires. More particularly, the present invention aims at disclosing a method and tool for detecting the absence of such a POTS splitter that is fast, non-complex, reliable, and does not require the presence or assistance of the customer.

BACKGROUND OF THE INVENTION

It is well known that DSL technology is not compatible with POTS devices such as a telephone or fax apparatus concurrently using the same wiring. In order to guarantee a reliable and stable DSL service, a POTS splitter, i.e. a dedicated device filtering the POTS frequency band from the frequency bands used for upstream and downstream DSL service, is installed. Such POTS splitter has to be installed centrally or on each POTS device at the customer premises. The installation of such POTS splitter(s) is often done by the end-user.

Absence or improper installation of a POTS splitter leads to interference between POTS and DSL signals, resulting in DSL service degradation or service instability through transmission errors and resynchronizations. A DSL operator faced with service degradation or instability on a particular DSL line must determine the cause of the service degradation in order to be able to repair the service. In addition, the DSL operator must determine the responsible party of the service degradation in order to be able to charge the intervention or reparation costs to that party. Absence or improper installation of a POTS splitter may result in the end-user being charged for the intervention, whereas service degradation resulting from impairments in the DSL operator's domain are paid for by the DSL operator.

Several tools and mechanisms have been developed already to assist DSL operators in detecting the absence or improper installation of POTS splitters, but these existing methods are slow, complex, have limited reliability and/or require the presence of the customer as will be explained in the following paragraphs.

A straightforward solution consists in dispatching a technician to the customer premises in order to verify if all POTS devices have been configured properly with POTS splitters. Such solution is expensive and time consuming, and access is required to the customer premises, i.e. the end-user's home or office.

An alternative solution, the so-called time segmentation algorithm, relies on detection of parameter changes resulting from a transition between the on-hook and off-hook states of a telephone. In the absence of a POTS splitter, such transition exhibits an impedance change that is so severe that the DSL line has to resynchronize. After the transition between on-hook and off-hook state, the operational line parameters of the DSL line, like bit rate, noise margin, signal-to-noise ratio or SNR, etc. have changed completely. By monitoring the parameter variations at the transition from on-hook to off-hook state, the time segmentation algorithm can detect absence of a POTS splitter.

The time segmentation algorithm is disadvantageous in that it requires at least one phone call to happen on the monitored line. Detection of the absence of a POTS splitter consequently is slow because typical monitoring periods of 1 day are required in order to capture a phone call. Moreover, the end-user must be present at the customer premises to pick up the phone.

The time-segmentation algorithm may be improved by inducing a phone event, e.g. sending a ringing signal in the POTS frequency band, while monitoring the DSL operational line parameter changes. The ringing signal however may be insufficient to cause detectable parameter variations. The best results are obtained when the phone transits from on-hook to off-hook status, but this so called interactive test requires presence of the end-user at the customer premises to pick up the phone. This improved time-segmentation algorithm is further disadvantageous in that it requires access to both DSL and telephone switch infrastructure. This involves complex Operation Support System (OSS) integration.

Another existing solution relies on detection of leakage of signal power from the upstream DSL band into the downstream DSL band as a result of inter-modulation induced by a POTS device in the absence of a POTS splitter. The inter-modulation phenomenon is not linear. As a result, a small variation in the upstream transmitted power may result in large variation of for instance the SNR in the downstream band. This existing test therefore consist in varying the upstream transmitted power and monitoring the operational line parameter changes in the downstream band.

Although no access is required to POTS equipment and the presence of a person at the customer premises is no longer needed, this method still involves complex OSS integration because a change in the line configuration parameters is needed. The test based on inter-modulation is further poorly reliable because not all POTS devices induce an inter-modulation level that is sufficiently to make POTS splitter absence detectable. Further, the test is plagued by false positive detection because other impairments, like for instance oxidized contacts, can also create inter-modulation.

It is an objective of the present invention to provide a device and method for detection of absence of a POTS splitter on a DSL line that resolves the above mentioned shortcomings of existing solutions. More precisely, it is an objective of the present invention to disclose a device and method that detects the absence of a POTS splitter without dispatching technicians, without requiring lengthy monitoring periods, without requiring presence of a human being at the customer premises, without complex OSS integration involving access to POTS equipment, and with improved reliability.

SUMMARY OF THE INVENTION

According to the present invention, the above defined objectives are achieved by a device for detecting absence of a Plain Old Telephony Service or POTS splitter on a Digital Subscriber Line as defined by claim 1, the device comprising:
  means for collecting channel transfer function data for the Digital Subscriber Line; and
  means for detecting a single hole in the channel transfer function data.

Indeed, the typical input circuit of a telephone apparatus contains a metal-oxide varistor between the two wires of a telephone line. The metal-oxide varistor protects other components of the telephone apparatus by absorbing all potential surges that could be present on the line, e.g. as a result of lightning. This metal-oxide varistor will create a single hole in the channel transfer function, also called Hlog data in DSL standards. In absence of a POTS splitter, the single hole signature of the metal-oxide varistor will always be visible in the channel transfer function, irrespective of the fact the phone is on-hook or off-hook. Thus, the device according to the current invention requires a single collection of the Hlog data, which can be realized in a few seconds, and a technique to detect a single hole in the Hlog data. It does not require long monitoring periods, complex integration with a POTS switch, a change in the DSL configuration parameters, or the presence of a human being at the customer premises for interactive testing. The collection of the Hlog data can be done anytime.

According to an optional aspect of the device according to the present invention, defined by claim 2, the means for detecting a single hole may comprise means for computing a curve derivative of the channel transfer function data, and means for detecting a local minimum from the curve derivative.

Indeed, one way to detect a hole in the channel transfer function data may rely on derivative calculation. A change from negative to positive derivative values while the derivative curve crosses zero then indicates the presence of a local minimum or hole in the channel transfer function.

According to another optional aspect, defined by claim 3, the means for detecting a single hole may be adapted to detect the single hole in a frequency range above 2.2 Megahertz.

Indeed, most POTS devices create a hole in a frequency range above 2.2 MHz. The invention preferably takes advantage of this knowledge and may scan in particular these frequencies in the channel frequency response, i.e. the frequencies slightly above 2.2 MHz used by VDSL2 technology, to detect a POTS device with absent or improperly installed POTS splitter. It is however not excluded that certain phone models would create a hole below 2.2 Mhz.

Further optionally, as defined by claim 4, the device according to the current invention may comprise:
means able to detect the presence of plural holes in the channel transfer function data; and
means for discriminating absence of a POTS splitter causing a single hole in the channel transfer function data from another line impairment causing plural holes in the channel transfer function data.

Opposite to metal-oxide varistors, other loop impairments like bridged taps, segments with mismatching impedance, bad contacts, etc., generate a series of regularly spaced holes in the channel transfer function. The device according to the current invention used to detect absence of a POTS splitter, discriminates situations wherein a single hole is present in the channel transfer function from situations wherein plural holes are present in the channel transfer function. The device according to the invention may or may not be combined with functionality able to analyse a series of holes in the Hlog data in order to also recognize other impairments, different from a missing POTS splitter.

In addition to a device as defined by claim 1, the present invention also relates to a corresponding method for detecting absence of a Plain Old Telephony Service or POTS splitter on a Digital Subscriber Line as defined by claim 5, the method comprising:
collecting channel transfer function data for the Digital Subscriber Line; and
detecting a single hole in the channel transfer function data.

DETAILED DESCRIPTION OF EMBODIMENT(S)

The invention provides a simple and rapid way to detect a missing POTS splitter on a DSL. The invention is based on a single data collection that can be done in a few seconds, while the best existing solutions typically require the occurrence of at least one phone call during the test, that implies very long test duration, typically at least one day. According to the invention, the missing POTS splitter is identified from a single Hlog measurement, by detecting the presence of a single hole in the Hlog curve. This hole detection corresponds to the detection of a local minimum in the curve. This subject has been studied widely and various methods can be used for the detection of local minima in a curve, like for example, methods based on the curve derivative.

Figure 1:
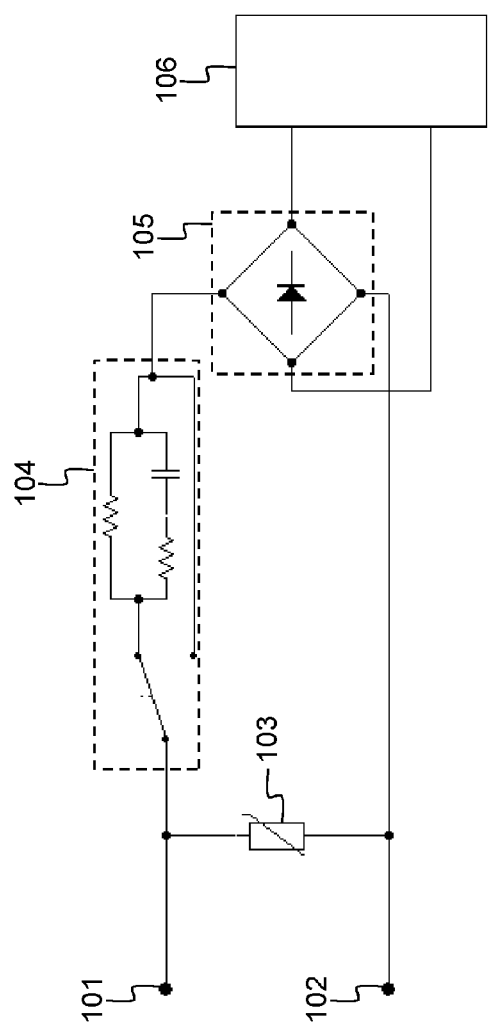
FIG. 1 illustrates a typical input circuit of a POTS device.

The reason why a POTS device creates such a signature in the Hlog curve is illustrated by FIG. 1 wherein a typical input circuit of a modern, electronic POTS device is drawn. The very first component connected between the two wires 101 and 102 of a phone lines is a metal-oxide varistor 103. The purpose of the metal-oxide varistor 103 is to protect the other electronic components of the POTS device, i.e. the hook switch 104, rectifier bridge 105 and POTS integrated circuit 106, by absorbing all the potential surges that could be present on the line, for example due to lightning.

Metal-oxide varistors like 103 are made of a thin ceramic layer of various metal oxides like Zinc acting as an insulator, sandwiched between two conducting metallic electrodes. By construction, this results in a capacitor.

When the metal-oxide varistor 103 is placed in the POTS device, the component legs together with the printed circuit board tracks are creating an inductance. That inductance will resonate with the metal-oxide varistor capacitance. At the resonance frequency, the impedance of the metal-oxide varistor will reach a minimum and the metal-oxide varistor will act as a short circuit. This behavior explains the single hole visible in the Hlog curve of a DSL line that is terminated by a POTS device without POTS splitter.

It is noticed that metal-oxide varistors are widely used in all modern POTS devices as they are really needed to protect all the electronic circuits from lightning surges. Moreover, they are always used as the first component connected to the line, even before the hook switch. Therefore their signature in the Hlog is always visible, irrespective of the fact a phone is on-hook or off-hook.

Figure 2:
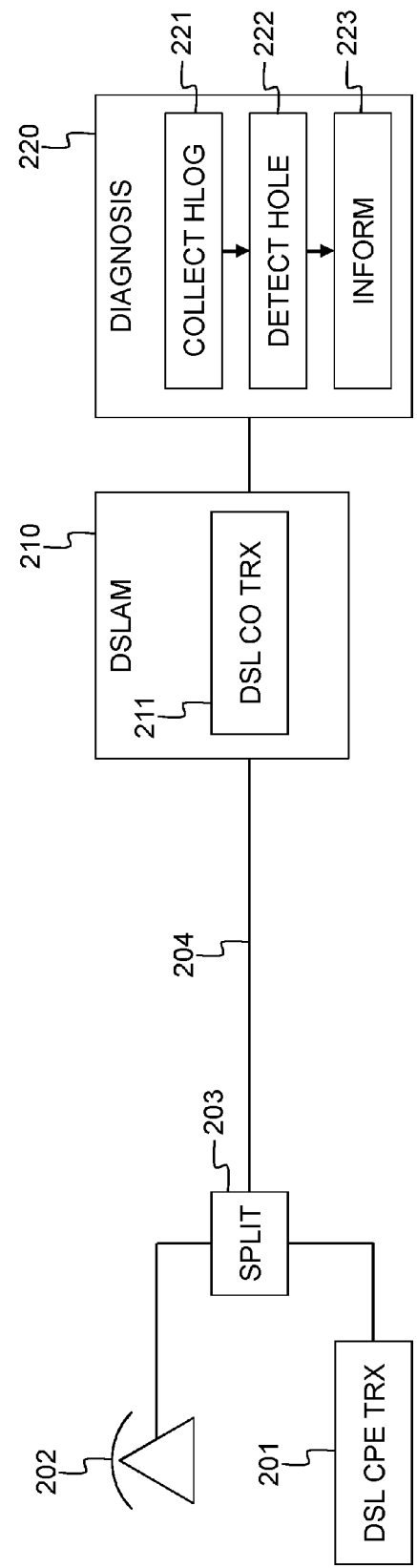
FIG. 2 illustrates an embodiment of the device for detecting absence of a POTS splitter according to the present invention.

FIG. 2 illustrates an embodiment of the invention. A DSL Customer Premises Equipment (CPE) Transceiver 201 and a phone 202 are connected to twisted pair telephone wiring 204 via a POTS splitter 203. The DSL CPE transceiver 201 communicates with a DSL Central Office (CO) Transceiver 211 that forms part of a Digital Subscriber Line Access Multiplexer 210. The DSL operator further has a network diagnosis tool, 220 or DIAGNOSIS, that analyzes the entire operator's DSL network. This network diagnosis tool 220 hosts a module 221 that automatically collects channel frequency response data, also named Hlog data. The network diagnosis tool 220 in addition contains a module 222, e.g. a software module running on a processor, to analyze the Hlog data and to detect a single hole therein. The network diagnosis tool 220 at last contains a module 223 that is able to inform the operator on the fact that a POTS splitter is missing or not properly installed on a DSL line where a single hole is detected in the Hlog data curve.

Figure 3:
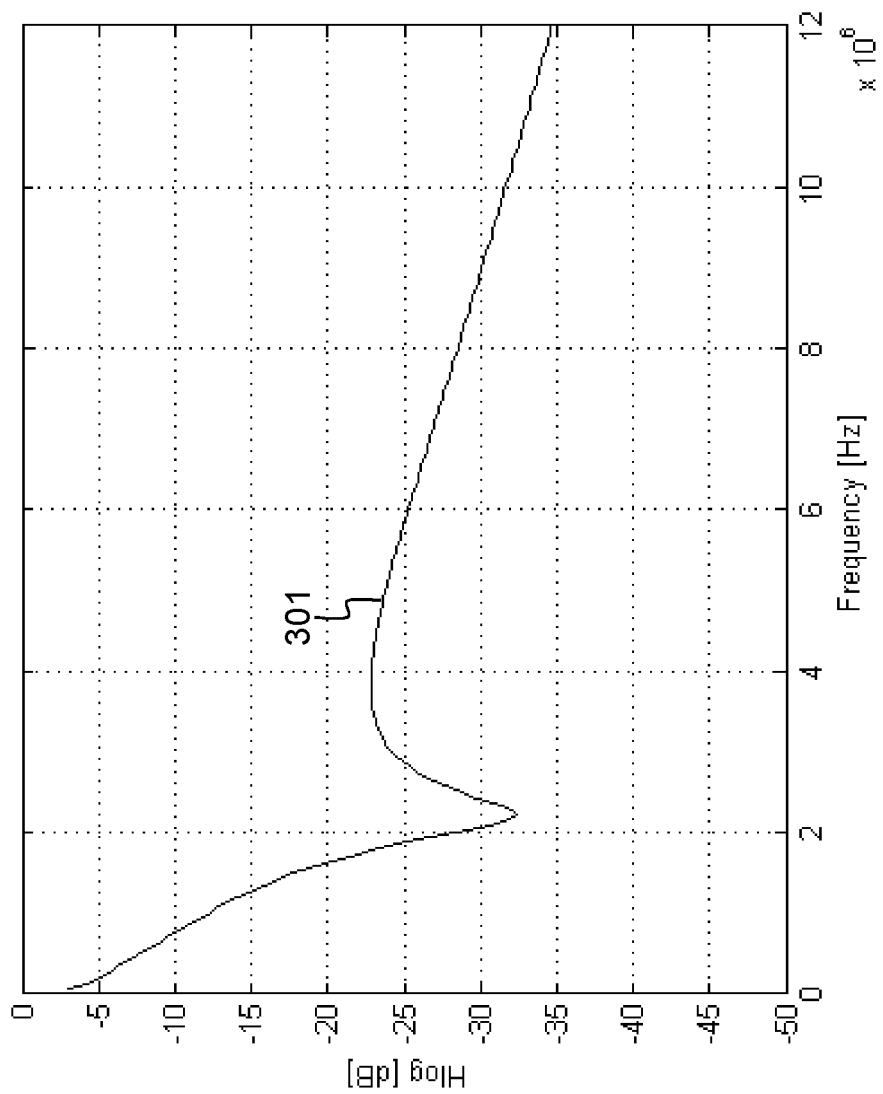
FIG. 3 illustrates a channel transfer function, measured on a Digital Subscriber Line terminated by a POTS device without POTS splitter.

FIG. 3 shows a channel transfer function 301 measured on a 1 kilometer DSL loop terminated by a phone without any POTS splitter. The curve 301 shows a single hole slightly above 2.2 MHz.

Possibly, the invention takes advantages of the higher frequencies available in VDSL2 in order to scan these higher frequencies for a single hole enabling detection of the presence of a POTS device without POTS splitter via the channel transfer function data. The reason therefore lies in the fact that the hole caused by POTS devices usually appears slightly above 2.2 MHz, making it visible in VDSL2. For this reason, the present invention is better suited to deal with VDSL2 lines than with ADSL2+ lines. It is however not excluded that certain phone models create a hole below 2.2 MHz in which case the hole becomes visible in the ADSL2+ frequency band too.

In addition to providing a simple and fast way for detecting absence of a POTS splitter, the invention is advantageous in that it does not require a complex integration with the POTS switch, a change in the settings of the DSL lines or the presence of the customer at home.

Figure 4:
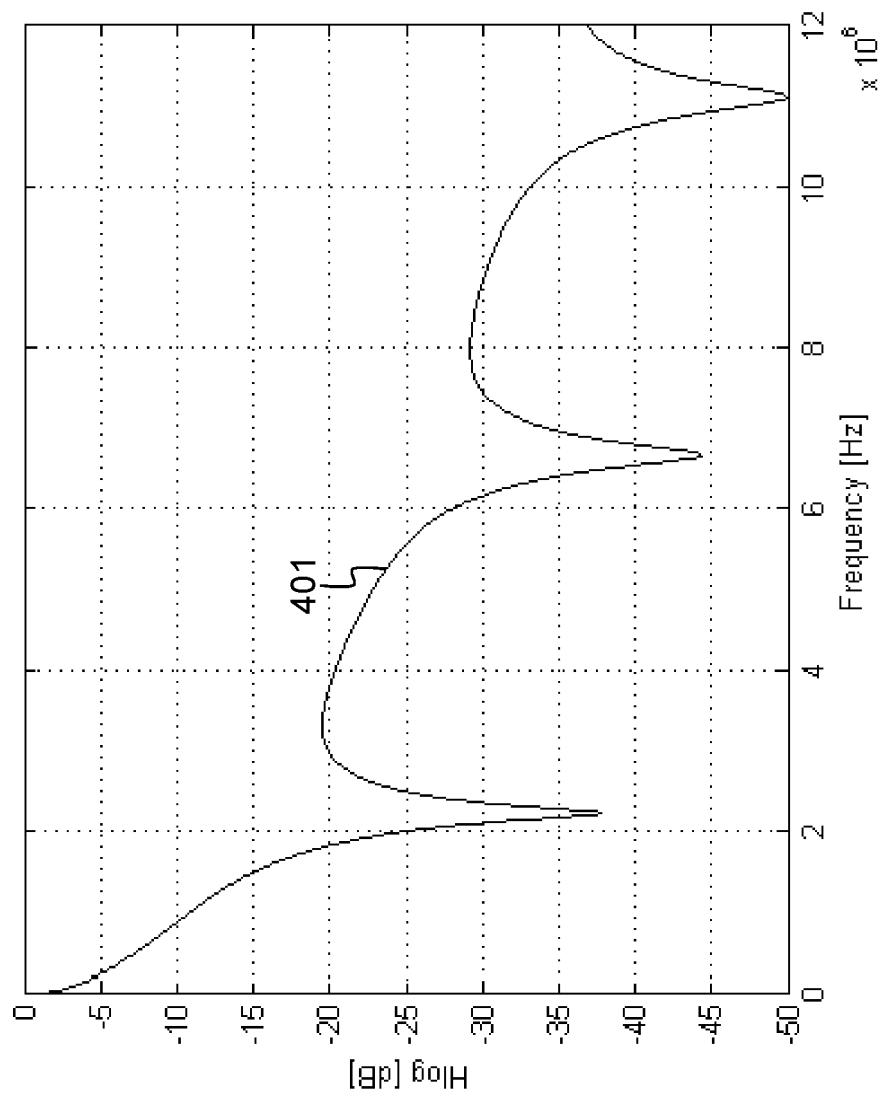
FIG. 4 illustrates a channel transfer function, measured on a Digital Subscriber Line with a bridged tap.

It is also noticed that metal-oxide varistors are creating a single hole in the Hlog curve, opposite to other loop impairments like bridged-taps, impedance mismatched segments or bad contacts that typically create a series of regularly spaced holes in the Hlog curve. Such regularly spaced behavior of holes measured on a 1 kilometer DSL loop with a 22 meter bridged tap is illustrated by channel transfer function 401 in FIG. 4.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A device configured to detect absence of a Plain Old Telephony Service (POTS) splitter or an improper installation of the POTS splitter on a Digital Subscriber Line, said device comprising:
    a processor configured to,
        collect channel transfer function data for said Digital Subscriber Line,
        detect a single hole in said channel transfer function data to distinguish a presence of the single hole from a presence of a plurality of holes in said channel transfer function data, and
        provide an indication that the POTS splitter is absent or not properly installed on the Digital Subscriber Line when the processor detects the single hole in said channel transfer function data.

2. The device according to claim 1, wherein said processor is further configured to,
    determine a curve derivative of said channel transfer function data, and
    detect a local minimum from said curve derivative, to detect the single hole.

3. The device according to claim 1, wherein said processor is configured to detect the single hole in a frequency range above 2.2 Megahertz.

4. The device according to claim 1, wherein said processor is further configured to,
    detect the presence of the plurality of holes in said channel transfer function data; and
    distinguish the absence of the POTS splitter causing the single hole in said channel transfer function data from another line impairment causing the plurality of holes in said channel transfer function data.

5. A method for detecting absence of a Plain Old Telephony Service (POTS) splitter or an improper installation of the POTS splitter on a Digital Subscriber Line, said method comprising:
    collecting channel transfer function data for said Digital Subscriber Line;
    detecting a single hole in said channel transfer function data to distinguish a presence of the single hole from a presence of a plurality of holes in said channel transfer function data, and
    providing an indication that the POTS splitter is absent or not properly installed on the Digital Subscriber Line when the single hole is detected in said channel transfer function data.

* * * * *